US009915305B2

(12) United States Patent
Stephens et al.

(10) Patent No.: US 9,915,305 B2
(45) Date of Patent: Mar. 13, 2018

(54) RETENTION PIN HAVING FOOT FOR HOLDING SPRING IN DISC BRAKE PACK REACTION PLATE DURING ASSEMBLY AND FOR OPERATING STATOR DISC

(71) Applicant: Deere & Company, Moline, IL (US)

(72) Inventors: Austin B. Stephens, Coffeyville, KS (US); Jeffrey S. Turner, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/176,192

(22) Filed: Jun. 8, 2016

(65) Prior Publication Data

US 2017/0356512 A1   Dec. 14, 2017

(51) Int. Cl.
  *F16D 65/00* (2006.01)
  *F16D 55/36* (2006.01)
  *F16D 55/00* (2006.01)

(52) U.S. Cl.
  CPC ........... *F16D 65/005* (2013.01); *F16D 55/36* (2013.01); *F16D 2055/007* (2013.01)

(58) Field of Classification Search
  CPC .. F16D 65/005; F16D 55/36; F16D 2055/007; F16D 55/24; F16H 1/28; F16H 3/44; F16H 48/06; B60K 17/046
  USPC ........................................................ 475/159
  See application file for complete search history.

(56) References Cited

U.S. PATENT DOCUMENTS

| 4,641,983 | A | 2/1987 | Strässle |
| 6,854,541 | B2 | 2/2005 | Matufuji et al. |
| 8,500,591 | B2 | 8/2013 | Turner et al. |
| 2012/0196715 | A1* | 8/2012 | Turner ................. B60K 17/046 475/159 |

FOREIGN PATENT DOCUMENTS

| DE | 10231499 | | 1/2004 | |
| GB | 2161560 | A * | 1/1986 | ............. F16D 55/36 |

* cited by examiner

*Primary Examiner* — Melanie Torres Williams

(57) ABSTRACT

A friction drive arrangement includes a plurality of interleaved rotor and stator discs. An end stator disc is adjacent a reaction plate containing a plurality of cylindrical, stepped bores defining spring receptacles opening toward the end stator disc and pin guide holes opening in an opposite direction. Each receptacle contains a coil compression spring located between a bottom of the receptacle and a spring retention pin having a first end section reciprocably received in the guide hole and having a second end section defined by a large diameter foot located between an end of the spring and the end stator disc, with the foot being configured for directly engaging the end stator disc. A tool is used to retract the pins and associated springs into the associated receptacles so as to retain the springs during assembly. Excess retraction of the pins is prevented for preventing over-compression of the springs.

10 Claims, 4 Drawing Sheets

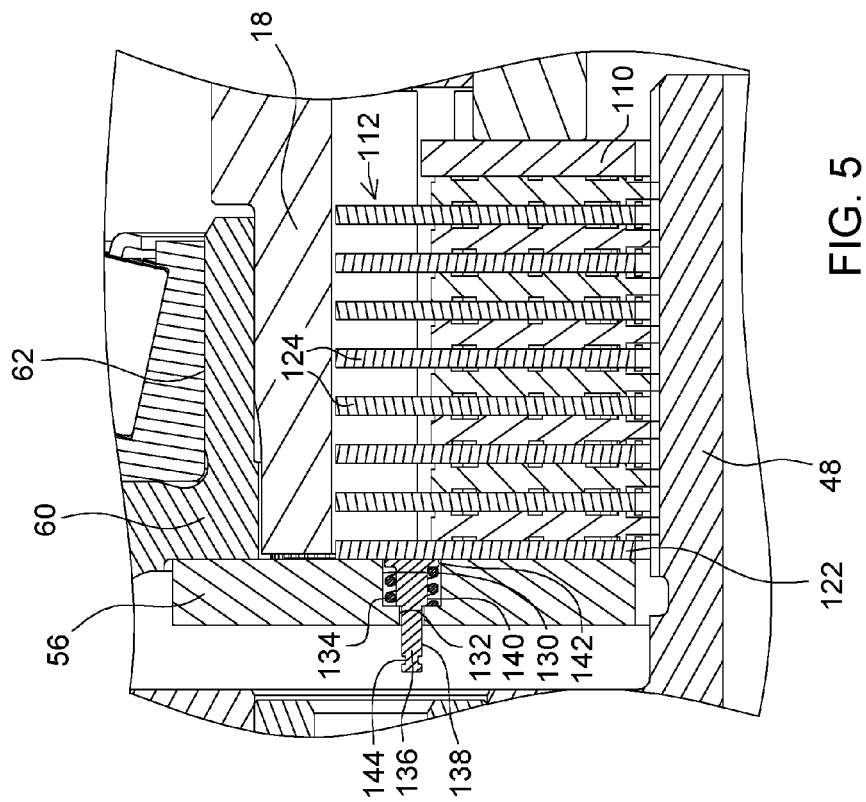
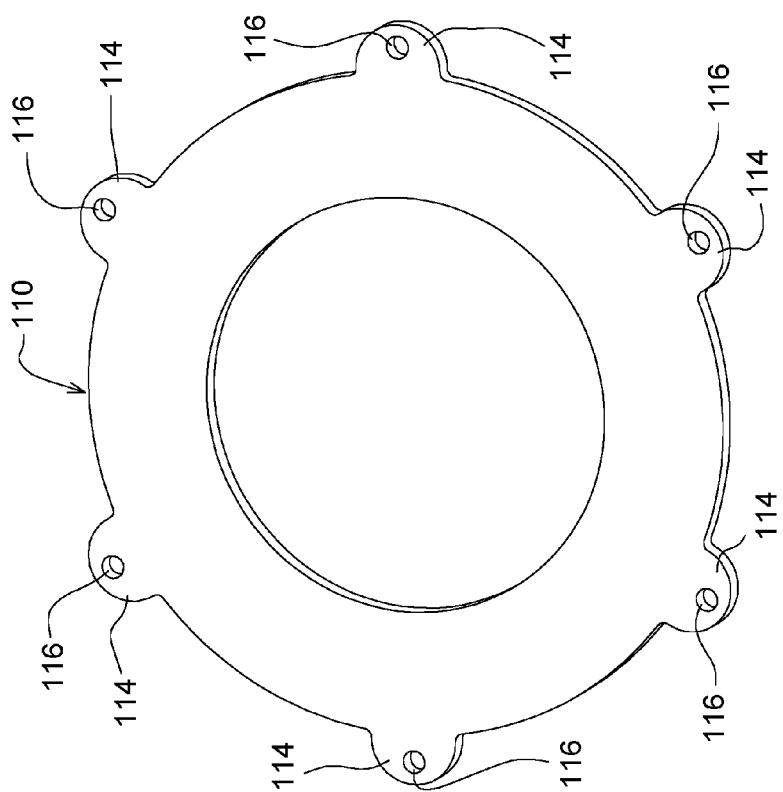
FIG. 4
FIG. 5

RETENTION PIN HAVING FOOT FOR HOLDING SPRING IN DISC BRAKE PACK REACTION PLATE DURING ASSEMBLY AND FOR OPERATING STATOR DISC

TECHNICAL FIELD

The present application relates generally to disc clutches or brakes.

BACKGROUND

Friction drive arrangements sometimes include coil compression springs which are mounted within cylindrical spring receptacles provided in a reaction plate of the arrangement and have ends which bear directly on a stator disc of the disc clutch or brake. One current design of such an assembly is disclosed in U.S. Pat. No. 8,500,591 issued Aug. 6, 2013 and has the drawbacks of the springs causing wear of the engaged stator disc and of the springs tending to fall out of spring receptacles of the reaction plate during assembly (currently grease or petroleum jelly is used to hold the springs in the receptacles).

Thus, what is needed is a disc clutch or brake assembly of the type described which does not have the above-noted drawbacks

SUMMARY

Various aspects of examples of the disclosure are set out in the claims.

According to a first aspect, there is provided a brake assembly including a plurality of stator plates interleaved with a plurality of rotor discs and being mounted for shifting axially along a drive axis; one of said plurality of stator plates being an end stator plate; a reaction plate being located axially adjacent said end stator plate and containing at least one spring receptacle having a receptacle axis disposed parallel to said drive axis and opening axially toward said end stator plate; a coil compression biasing spring being located in said at least one spring receptacle; and a spring retaining pin disposed along said receptacle axis and being mounted for shifting axially in, and extending through, said reaction plate, said retaining pin having an exposed outer end portion located at a side of said reaction plate opposite from said end stator plate, and said retaining pin further having an inner end defined by an enlarged foot located between the end stator plate and an axially inner end of said coil compression spring, whereby, during assembly of the friction drive arrangement, a tool may be engaged with the exposed outer end portion of the spring retaining pin held in a retracted position wherein said foot retains the coil compression spring within the receptacle.

According to a second aspect, there is provided a brake assembly including a retaining pin provided with a stop which engages a reaction plate so as to prevent the pin from being retracted to an extent that would result in overcompression of the compression spring.

According to a third aspect, there is provided a brake assembly including a plurality of interleaved stator discs and rotor discs, with one of the stator discs being an end stator disc; a reaction plate located adjacent the end stator disc and containing at least two spring receptacles located at diametrically opposite sides of, and having respective axes extending parallel to, a drive axis and opening toward the end stator disc; first and second coil compression springs respectively located in the at least two spring receptacles; and a spring retaining pin disposed along the axis of each of the two spring receptacle axes and being mounted for shifting axially in, and extending through, said reaction plate, said retaining pins each having an exposed outer end portion located at a side of the reaction plate opposite from the end stator disc, and each retaining pin further having an inner end defined by an enlarged foot located between the end stator disc and an axially inner end of an associated coil compression spring, whereby, during assembly of the friction drive arrangement, a tool may be engaged with the exposed outer end portion of each spring retaining pin for holding each pin in a retracted position wherein said foot retains the associated coil compression spring within the receptacle.

According to a fourth aspect, a brake assembly includes a plurality of stator discs interleaved with a plurality of rotor discs and being mounted for shifting axially along a drive axis; one of said plurality of stator discs being an end stator disc; a reaction plate being located axially adjacent said end stator disc and containing at least one spring receptacle having a receptacle axis disposed parallel to said drive axis and opening axially toward the end stator disc; a coil compression biasing spring being located in said at least one spring receptacle; and a spring retaining pin disposed along said receptacle axis and being mounted for shifting axially in, and extending through, said reaction plate, the pin having an inner end defined by an enlarged foot that is biased into engagement with the end stator disc so as to separate the end stator disc from said reaction plate when a brake release condition is desired.

These and other aspects will become apparent from a reading of the ensuing description together with the appended drawings.

BRIEF DESCRIPTION OF THE DRAWINGS

The detailed description of the drawings refers to the accompanying figures in which:

FIG. 4 is an enlarged view of one of the spring retention pins shown in FIGS. 2 and 3; and FIG. 5 is a vertical sectional view of a peripheral segment of the combined park brake and service brake arrangement of FIG. 1 including the reaction plate, one of the stepped bores containing the coil compression spring and spring retention pin and the stator disc mounted adjacent the reaction plate.

DETAILED DESCRIPTION OF THE DRAWINGS

At least one example embodiment of the subject matter of this disclosure is understood by referring to FIGS. 1 through 5 of the drawings.

Figure 1:
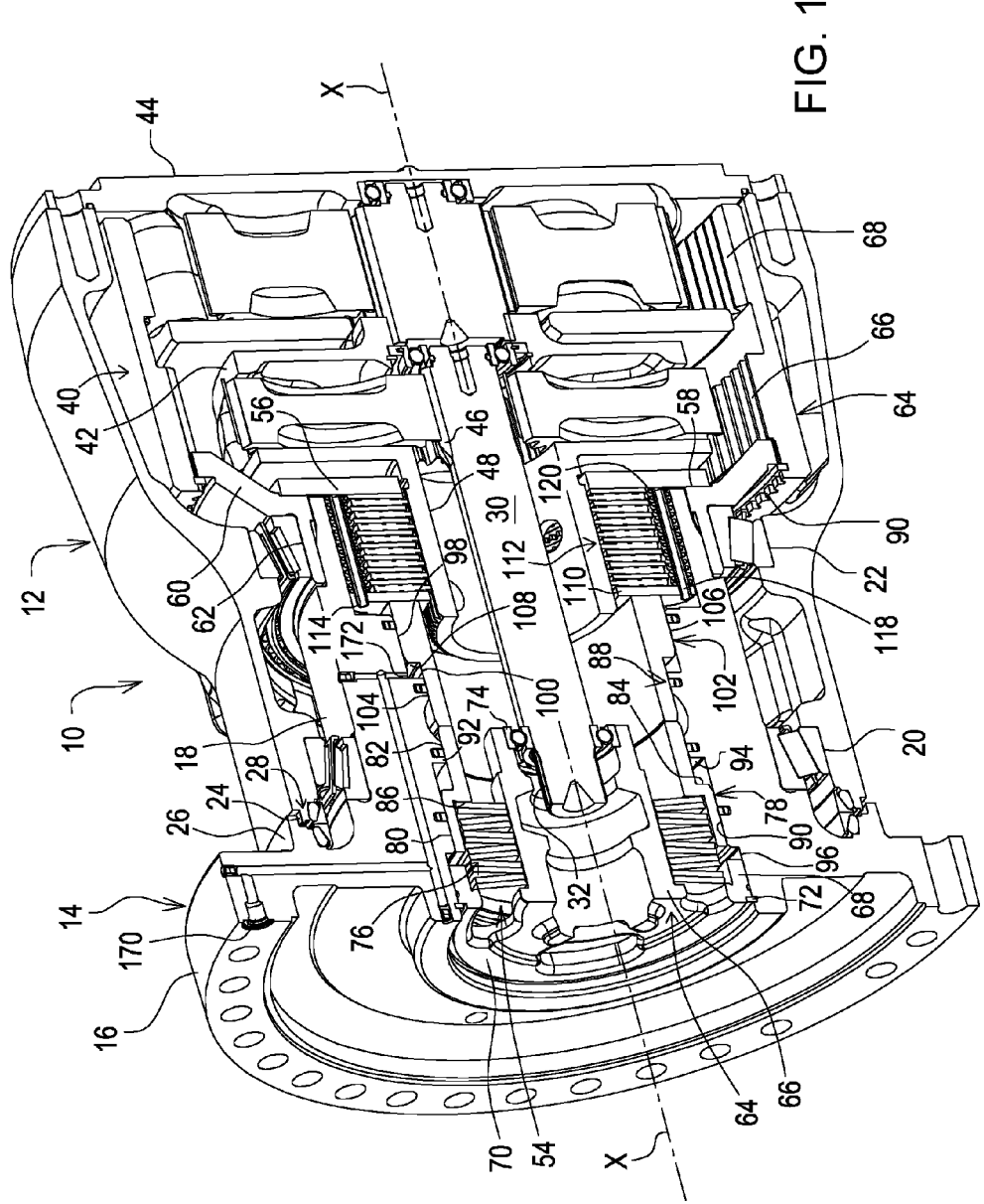
FIG. 1 is a perspective longitudinal sectional view of a portion of a final drive transmission arrangement containing a service and park brake arrangement embodying the present invention.

Referring now to FIG. 1, there is shown a final drive arrangement 10 including a bell-shaped wheel hub 12 and a spindle 14, the spindle 14 including an annular mounting flange 16 containing a plurality of mounting holes and being joined to, and projecting radially from, an inner end of a generally cylindrical section 18 of the spindle extending axially within a smaller end of the bell-shaped hub 12. The spindle 14 is adapted for being mounted to a vehicle chassis (not shown) by inserting fasteners through the mounting holes in the flange 16.

The wheel hub 12 is supported for rotating about the cylindrical section 18 of the spindle by axially inner and outer tapered roller bearings 20 and 22, respectively, with the inner end of the wheel hub 12 being radially outboard of the inner roller bearing 20 and being defined by an axially inward projecting, stepped annular flange 24 having an outer step disposed immediately outward of an annular, axially outward projecting flange 26 of the spindle mounting flange 16. Located within a cavity defined by the annular flanges 24 and 26 is a metal face seal assembly 28 including first and second opposed metal rings respectively located within the annular flanges 24 and 26.

Located along a drive X-X extending centrally within the wheel hub 12 is a drive shaft 30 having a splined inner end section 32 adapted for having a driven input shaft (not shown) coupled thereto using a sleeve-like drive coupler (not shown).

Drive torque is transferred from the drive shaft 30 to the wheel hub 12 by a gear reduction comprising a two-stage planetary transmission 40 including first and second stage planet carriers 42 and 44, respectively. The first stage planet carrier 42 is disposed in surrounding relationship to a first stage sun gear 46 formed on an outer end region of the drive shaft 30. The first stage carrier 42 includes a cylindrical, axially extending, inner end section 48 projecting inside the spindle section 18 in concentric spaced relationship to the drive shaft 30 and to an inner cylindrical surface 50 (see FIG. 2) of the spindle section 18 in which is formed twelve substantially semi-circular recesses 52 spaced at equal angles from each other about the drive axis X-X.

Figure 2:
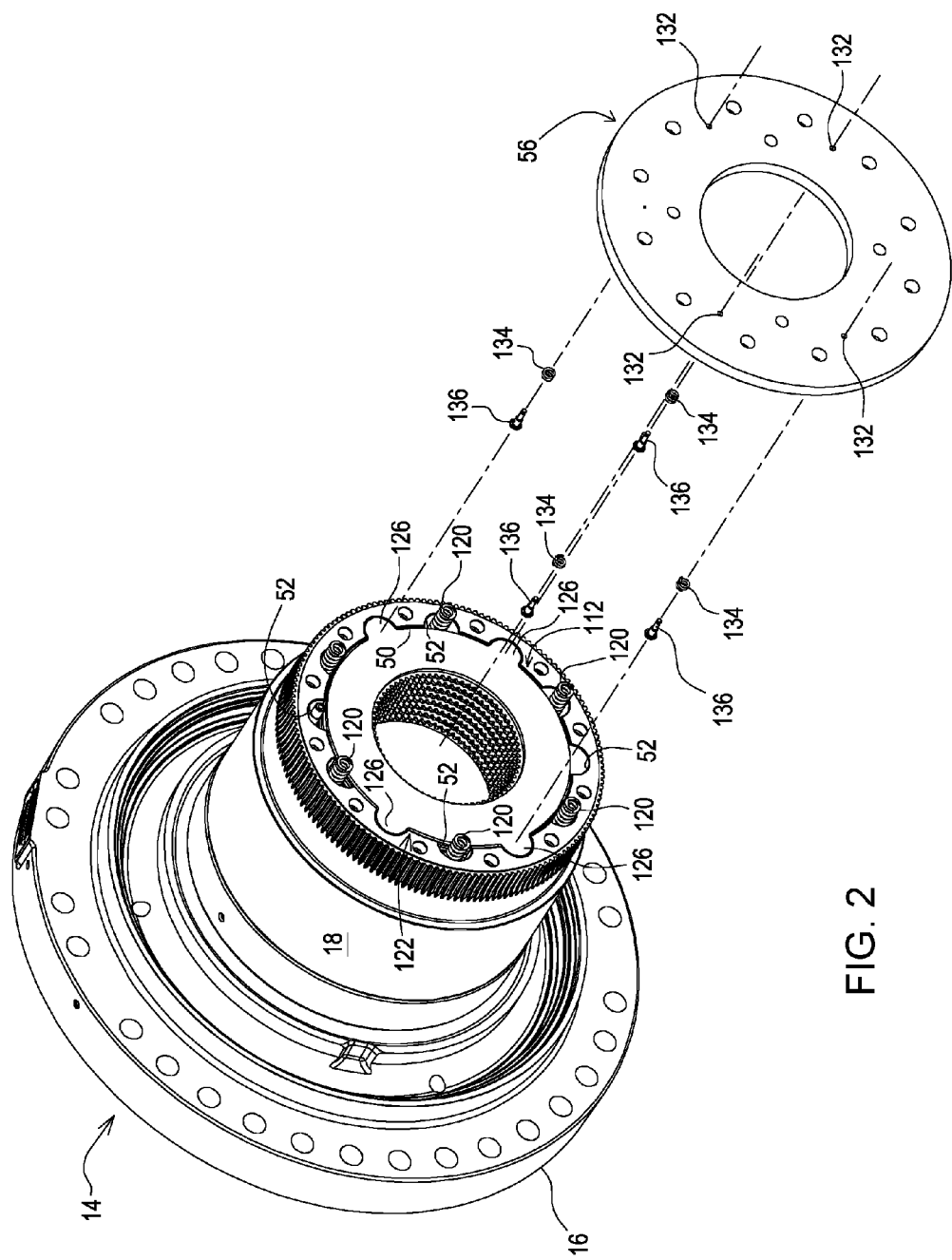
FIG. 2 is a perspective view of the spindle section of the final drive transmission arrangement of FIG. 1 showing an exploded representation of the reaction plate, spring retention pins and associated coil compression springs that act to shift the adjacent stator disc of the brake disc pack away from the reaction plate when the parking brake is released.
Figure 3:
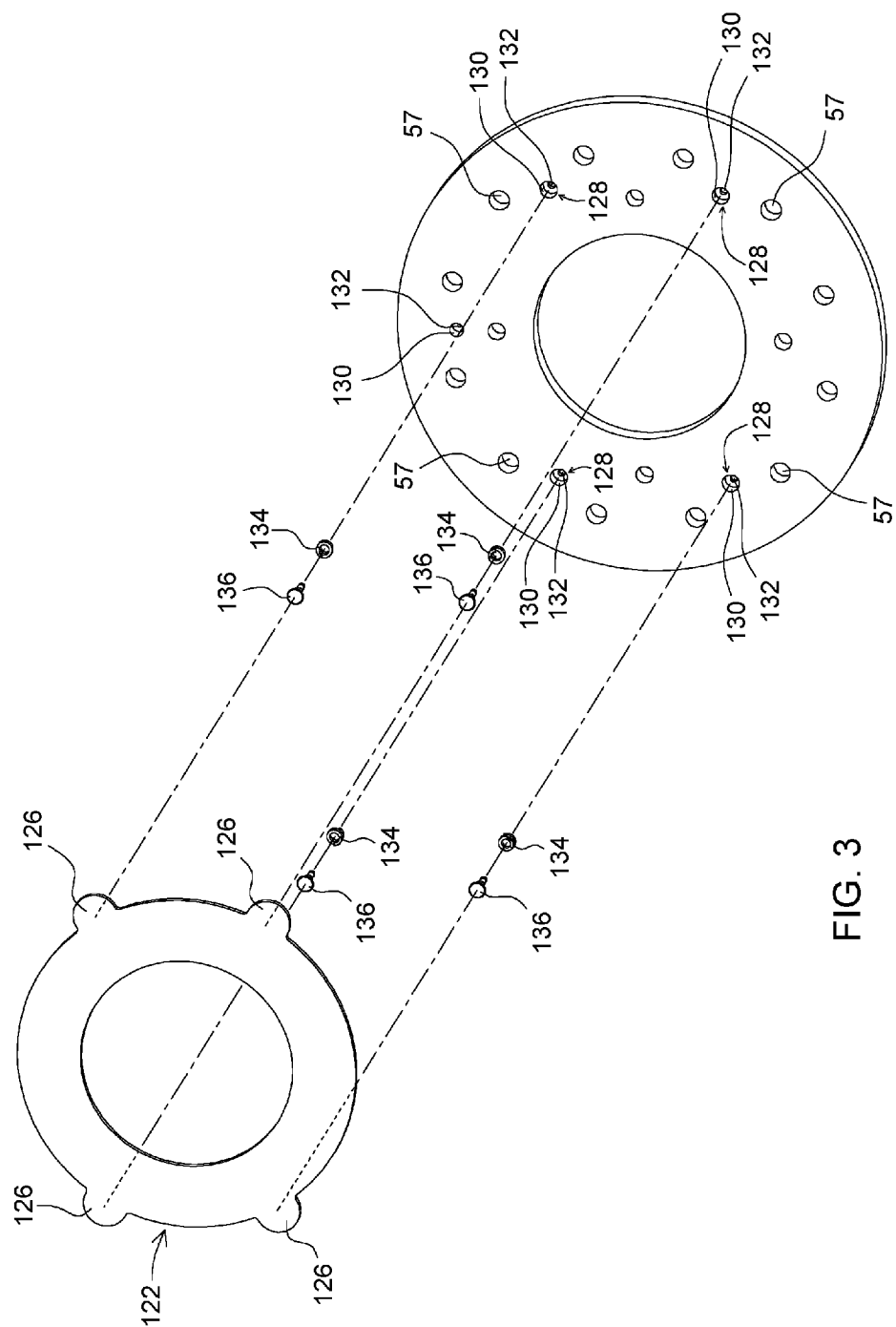
FIG. 3 is a perspective, exploded view of the brake arrangement stator disc, spring retention pins, coil compression springs and reaction plate of FIG. 2 taken from an opposite direction so as to reveal the spring retention receptacles.

Referring now also to FIGS. 2-4, it can be seen that a combined service and park brake arrangement 54 is mounted interiorly of the cylindrical section of the spindle 14. The brake arrangement 54 includes an annular brake reaction plate 56 secured to an axially outward facing end of the cylindrical section 18 of the spindle 14, as by mounting bolts (not shown) inserted into bores arranged in a circular pattern (see a representative number being indicated at 57 in FIG. 3) and threaded into aligned threaded bores provided in the cylindrical section 18. An annular outer region of the plate 56 is also clamped against an annular surface 58 of a ring gear hub 60 having a cylindrical, axially inner end section 62 having a splined connection with an axially outer end region of the cylindrical section 18 of the spindle 14. A cylindrical outer surface of the end region 62 of the hub 60 serves as a seat for an inner race of the axially outer tapered roller bearing 22.

The brake assembly 54 further includes an input quill 64 including a cylindrical hub portion 66, a cylindrical mounting portion 68 located radially outward of, and disposed concentric to, the hub portion 66 and a radially extending, axially inner end portion 70 joining inner ends of the hub portion 66 and the mounting portion 68. The mounting portion 68 is tightly received in an annular recess provided interiorly of an inner end region of the spindle 14 and is held in place by a snap ring 72 located in an annular snap ring groove provided in the spindle 14 and abutting the inner end of the quill mounting portion 68. A thrust bearing 74, in the form of a ball bearing, has an outer race pressed into an axially outer, interior location of the quill hub portion 66, and has an inner race pressed onto the drive shaft 30 at a location immediately axially outward of the splined inner end 32 of the shaft 30. Thus, the quill 64 rotatably supports the drive shaft 30. The hub portion 66, mounting portion 68, and end portion 70 cooperate to define an annular, axially outwardly opening receptacle in which is received an inner end of a stack of Belleville springs 76 which act, as described below, to apply a force for engaging the park brake when fluid pressure for disengaging the park brake and for applying the service brake is removed.

Provided for selectively compressing the stack of Belleville springs 76 so as to release the park brake is a stepped cylindrical park brake piston 78 including radially outer and inner sections 80 and 82, respectively, joined together to define an axially outward facing, annular shoulder 84 and an axially inward facing, annular shoulder 86 engaging an axially outward end of the stack of Belleville springs 76.

The cylindrical spindle section 18 is provided with a stepped piston bore 88 located immediately outward of the end section containing the quill mounting portion 68. The stepped piston bore 88 includes a first, radially outer bore section 90 slidably receiving the radially outer park brake piston section 80, and being joined to a central, radially inner bore section 92 slidably receiving the radially inner brake piston section 82, with an axially inward facing shoulder 94 extending between the bore sections 90 and 92. It is noted that the mounting portion 68 of the quill has an annular axially outward facing end defining a stop surface 96 which is in the path of axially inward movement of the outer park brake piston section 80 and serves to prevent the park brake piston 78 from compressing the stack of Belleville springs 76 to the extent that they become flattened to a solid height.

Thus, it will be appreciated that the location of the input quill 64 at the inner end of the spindle 14 makes it easy to assemble the input quill 64 together with the thrust bearing 74, stack of Belleville springs 76 and park brake piston 78.

The stepped piston bore 88 further includes a second radially outer bore section 98 joined to an outward end of the central radially inner bore section 92 by an axially outward facing shoulder 100. A cylindrical, stepped diameter service brake piston 102 has an axially inner section 104 of a first outer diameter slidably received in the central radially inner bore section 92 and disposed in abutting relationship to an axially outer end of the park brake piston 78, when the park brake is engaged as illustrated in FIG. 1. The service brake piston 102 has an axially outer section 106 of a second outer diameter greater than the outer first diameter and joined to the axially inner section 104 such as to define an axially inward facing shoulder 108, with the outer piston section 106 being slidably received in the second outer bore section 98 and with the shoulder 108 being disposed for engaging the spindle shoulder 100, thereby limiting axial inward movement of the service brake piston 102 when the service brake is released. The service brake piston 102 has an axially outer end disposed in engagement with a pressure plate 110 located on an opposite side of a disc brake pack 112 from the brake reaction plate 56.

As can be seen in FIG. 4, the pressure plate 110 includes six substantially semi-cylindrical ears 114 formed at equally spaced locations about an outer peripheral edge thereof and received in alternate ones of the twelve axially extending recesses 52 provided in the annular interior surface 50 of the cylindrical section 18 of the spindle 14. Centered in each of the ears 114 is a spring guide mounting hole 116 in which tightly receives an axially inner end region of a tubular spring guide 118 on which is received a coil compression spring 120 having opposite ends in engagement with the pressure plate 110 and reaction plate 56 so as to maintain a disengaged condition in the disc brake pack 112 in the absence of pressure tending to press the pressure plate 110 toward the reaction plate 56.

As can be determined from FIGS. 1, 2 and 5, the disc brake pack 112 includes a plurality of stator discs 122 that are interleaved with a plurality of rotor discs 124, with one of the stator discs 122 being at an axially outer end of the disc pack next to the reaction plate 56 and with one of the rotor discs 124 being at an axially inner end of the disc pack next to the pressure plate 110. The stator discs 122 are rotatably fixed, but are mounted for shifting axially within the cylindrical section 18 of the spindle. For these purposes, each of the stator discs 122 includes four semi-cylindrical ears 126 which, as viewed in FIG. 2, are arranged such that first and second pairs of the four ears are respectively disposed diametrically opposite each other, with the first pair being respectively located for shifting axially within a first diametrically opposite pair of the six semi-circular recesses 52 in which the six ears 114 of the pressure plate 110 are received, and with the second pair being located in a second diametrically opposite pair of the six semi-circular recesses 52 respectively angularly indexed clockwise from the first diametrically opposite pair about the axis X-X by a distance equal to twice the angular distance between adjacent recesses 52. As is apparent in FIGS. 1 and 2, splines are provided on an outer diameter surface of the cylindrical, axially inner section 48 of the first stage planet carrier 42 and an inner diameter of the rotor discs 124 are provided with teeth that are in engagement with the planet carrier splines so that the rotor discs 124 are mounted for rotating with the planet carrier 42 and for shifting axially relative to the planet carrier 42.

As can best be determined from FIGS. 2, 3 and 5, the reaction plate 56 is provided with four stepped cylindrical bores 128 respectively disposed in axial alignment with the four ears 126 of the stator discs 122. The stepped cylindrical bores 128 each include a larger diameter section forming a spring receptacle 130 opening axially toward the adjacent stator disc 122, and have a small diameter section forming a retainer pin guide hole 132. Located in each of the spring receptacles 130 is a coil compression spring 134 having an outer diameter that is just smaller than the diameter of the receptacle 130 and having a fully extended axial length sufficient for the spring to extend beyond an open end of the receptacle 130 when the spring is unloaded with an axially inner end engaged with an axially outer facing bottom surface of the receptacle.

Four identical cylindrical spring retention pins 136 are respectively axially centered within the four stepped cylindrical bores 128 and thus respectively within the four coil compression springs 134. Each of the spring retention pins 128 has a stepped diameter including an axially outer end guide section 138 reciprocably received in an associated one of the pin guide holes 132, an intermediate section 140 having a diameter larger than that of the associated guide hole 132, and an axially inner end section defining a spring-retaining foot 142 having a diameter slightly larger than that of the associated coil compression spring 134 but smaller than that of the associated receptacle 130. An axially outer region of the guide section 138 of each spring retention pin 136 is provided with a tool-receiving, annular groove 144 for being engaged by a tool (not shown) for simultaneously retracting the pins 136 within the receptacles 130 during assembly so that the coil compression springs 134 do not escape the receptacles 130, noting that this manner of spring retention is much more reliable and less messy than that of using grease or petroleum jelly to hold the springs within the receptacles as is sometimes currently done. Further, it is noted that since the diameter of the intermediate section 140 of each of the pins 136 is greater than the diameter of the associated pin guide hole 138, an axially outward facing annular shoulder 146 is formed which engages the bottom of the associated receptacle 130 so that axial outward movement of each pin 136 will be limited such that over-compression of the coil compression spring 134 is prevented, but with the intermediate section 140 having an axial length chosen such that the pin foot 142 and thus the engaged compression spring 134 will be completely within the receptacle 130, when a braking force is applied to the disc brake pack 112, for permitting the adjacent stator disc 122 to move into engagement with the reaction plate 56.

Another benefit of the spring retention pins 136 is that, during operation, the biasing force exerted by the coil compression springs 134 tending to separate the adjacent stator disc 122 from the reaction plate 56 will be transferred to the stator disc 122 by way of the pin feet 142, noting that the pin feet 142 each present an area of contact with the stator disc 122 that is much greater than that afforded by the inner end of the associated coil compression spring 134 thus resulting in less wear to the stator disc 122.

While the above describes an example embodiment of the present disclosure, these descriptions should not be viewed in a limiting sense. Rather, there are several variations and modifications which may be made without departing from the scope of the present invention as defined in the appended claims.

What is claimed is:

1. A friction drive arrangement, comprising: a drive housing arrangement;
   a drive shaft mounted along a drive axis within the housing arrangement;
   a drive component located within the housing and coupled for being driven by the drive shaft;
   a plurality of stator discs mounted to the housing for shifting axially and being interleaved with a plurality of rotor discs mounted for rotation with the drive component and for shifting axially relative to the drive component; and one of said plurality of stator discs being an end stator disc;
   a reaction plate being located axially adjacent said end stator disc and containing at least one spring receptacle having a receptacle axis disposed parallel to said drive axis and opening axially toward said end stator disc;
   a coil compression biasing spring being located in said at least one spring receptacle; and
   a spring retaining pin disposed along said receptacle axis and being mounted for shifting axially in, and extending through, said reaction plate, said retaining pin having an exposed axially outer end portion located at a side of said reaction plate opposite from said end stator disc, and said retaining pin further having an inner end defined by an enlarged foot located between the end stator disc and an axially inner end of said coil compression spring, whereby, during assembly of the friction drive arrangement, a tool may be engaged with the exposed outer end portion of said spring retaining pin held in a retracted position wherein said foot retains the coil compression spring within said receptacle.

2. The friction drive arrangement, as defined in claim 1, wherein said retaining pin is provided with a stop surface which engages said reaction plate so as to prevent the pin from being retracted to an extent that would result in over-compression of the compression spring.

3. The friction drive arrangement, as defined in claim 2, wherein the reaction plate includes a pin guide hole disposed in axial alignment with the spring receptacle; the retaining pin being cylindrical and constructed with a stepped diameter including a first end section received for reciprocal movement in said guide hole, an intermediate section and having a diameter larger than a diameter of said guide hole and defining said stop surface for engaging said reaction plate adjacent said guide hole, and a second end section defining said foot.

4. The friction drive arrangement, as defined in claim 1, wherein, in addition to said at least one spring receptacle, said mounting plate contains at least one more spring receptacle disposed like said at least one spring receptacle at a location on an opposite side of said drive axis from said at least one spring receptacle;
   another coil compression spring being located in said at least one more spring receptacle; and
   at least another retaining pin disposed within, and along an axis of, said at least one more spring receptacle, the at least another retaining pin including a foot located between the end stator disc and an axially inner end of said another coil compression spring, whereby, during assembly of the friction drive arrangement, an exposed axially outer end portion of said at least another spring retaining pin may be engaged by a tool and held in a retracted position wherein said foot of said at least another retaining pin retains the at least another coil compression spring within said one more spring receptacle.

5. The friction drive arrangement, as defined in claim 1, wherein said foot of said retainer pin is biased against said end stator disc so as to separate the end stator disc from said reaction plate when a brake release condition is desired.

6. A subassembly of a plurality of components for being assembled in a friction drive arrangement, the subassembly comprising:
   a disc brake reaction plate adapted for being centered on a drive axis and including at least one stepped cylindrical bore extending through the reaction plate so as to be in parallel relationship to the drive axis when assembled in the friction drive arrangement, wherein the cylindrical bore includes a first section defining a spring receptacle opening in first direction adapted to be toward a stator disc when the reaction plate is assembled and wherein the cylindrical bore further includes a second section smaller in diameter than said first section and defining a retainer pin guide hole extending from a bottom of the receptacle and opening in a second direction opposite from the first direction;
   a coil compression spring being located in said first section of the at least one stepped bore; and
   a cylindrical, stepped spring retention pin including a first end section reciprocably received in said second section of the at least one stepped cylindrical bore and a second end section reciprocably received within the first end section of the at least one stepped bore, with the coil compression spring being captured between the bottom of the receptacle and the second end section of the retention pin; and wherein the first end section of the spring retention pin has an exposed end region located for engagement by a tool for retracting the second end section of the pin against the coil compression spring and into the spring receptacle for thereby retaining the spring in the receptacle in preparation for assembling the subassembly in the friction drive arrangement.

7. The subassembly, as defined in claim 6, wherein the retention pin further includes an intermediate section joined between the first and second end sections and having a diameter which is greater than a diameter of the first end section of the stepped bore and less than a diameter of the second end section of the at least one stepped cylindrical bore, with the intermediate section having an axial length which results in the intermediate section of the pin abutting the bottom of the receptacle prior to the coil compression spring being overly compressed when the pin is being retracted for readying the subassembly for being assembled.

8. The subassembly, as defined in claim 6, wherein the exposed end region of the retention spring is provided with an annular groove adapted for engagement by the tool for retracting the second end section of the pin against the coil compression spring and into the spring receptacle.

9. The subassembly, as defined in claim 6, wherein the retention pin further includes an intermediate section joined between the first and second end sections and having a diameter which is greater than a diameter of the first end section of the stepped bore and less than a diameter of the second end section of the stepped bore and wherein a combined axial length of the intermediate section and the second end section is such that the second end section can be completely withdrawn into the spring receptacle before the intermediate section abuts the bottom of the spring receptacle.

10. The subassembly, as defined in claim 9, wherein the combined axial length of the intermediate section and the end section is chosen such that the intermediate section abuts the bottom of the spring receptacle prior to the spring being overly compressed when the pin is being retracted for readying the subassembly for being assembled.

\* \* \* \* \*